(12) United States Patent
Oguchi et al.

(10) Patent No.: US 12,533,747 B2
(45) Date of Patent: Jan. 27, 2026

(54) LASER PROCESSING HEAD, LASER PROCESSING SYSTEM, AND METHOD OF DETERMINING ABNORMALITY OF LASER PROCESSING SYSTEM

(71) Applicant: Panasonic Intellectual Property Management Co., Ltd., Osaka (JP)

(72) Inventors: Hisayuki Oguchi, Hyogo (JP); Masatoshi Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 916 days.

(21) Appl. No.: 17/826,969

(22) Filed: May 27, 2022

(65) Prior Publication Data
US 2023/0001506 A1 Jan. 5, 2023

(30) Foreign Application Priority Data
Apr. 2, 2021 (JP) ................................ 2021-063723

(51) Int. Cl.
*B23K 26/06* (2014.01)
*B23K 26/03* (2006.01)
(Continued)

(52) U.S. Cl.
CPC ........ *B23K 26/0604* (2013.01); *B23K 26/032* (2013.01); *B23K 26/0613* (2013.01);
(Continued)

(58) Field of Classification Search
CPC .............. B23K 26/0604; B23K 26/032; B23K 26/0613; B23K 26/064; B23K 26/0643;
(Continued)

(56) References Cited

U.S. PATENT DOCUMENTS

| 2001/0048654 A1* | 12/2001 | Miura .................. G11B 7/1362 |
| 2002/0097659 A1* | 7/2002 | Furuhata ................ G11B 7/127 369/112.17 |

(Continued)

FOREIGN PATENT DOCUMENTS

JP 2016-97412 5/2016

OTHER PUBLICATIONS

IP.com Search History (Year: 2025).*

*Primary Examiner* — Elizabeth M Kerr
*Assistant Examiner* — Keith Brian Assante
(74) *Attorney, Agent, or Firm* — Wenderoth, Lind & Ponack, L.L.P.

(57) ABSTRACT

Laser processing head 10 includes housing 11 and a plurality of optical components. Housing 11 is provided with partition wall 11a, first and second light entrance ports 12a, 12b through which first and second laser beams A, B respectively enter, and light irradiation port 13. Laser processing head 10 includes first and second photodetectors 91b, 92a provided around first and second light entrance ports 12a, 12b, respectively. First photodetector 91b is disposed opposite to second photodetector 92a across partition wall 11a. First photodetector 91b receives light in the second wavelength band including the wavelength of second laser beam B, and second photodetector 92a receives light in the first wavelength band including the wavelength of first laser beam A.

11 Claims, 12 Drawing Sheets

(51) Int. Cl.
*B23K 26/064* (2014.01)
*B23K 26/21* (2014.01)
*B23K 26/70* (2014.01)

(52) U.S. Cl.
CPC ........ *B23K 26/064* (2015.10); *B23K 26/0643* (2013.01); *B23K 26/0648* (2013.01); *B23K 26/21* (2015.10); *B23K 26/702* (2015.10); *B23K 26/707* (2015.10); *B23K 26/06* (2013.01)

(58) Field of Classification Search
CPC .. B23K 26/0648; B23K 26/21; B23K 26/702; B23K 26/707; B23K 26/06
See application file for complete search history.

(56) References Cited

U.S. PATENT DOCUMENTS

| | | | |
|---|---|---|---|
| 2016/0136756 A1* | 5/2016 | Ogura | B23K 26/21 219/121.64 |
| 2018/0186082 A1* | 7/2018 | Randhawa | B33Y 50/02 |
| 2022/0048135 A1* | 2/2022 | Brookhyser | B23K 26/0648 |

* cited by examiner

FIG. 9

| Optical Path | | Power (W) of first laser beam A | Power (W) of second laser beam B |
|---|---|---|---|
| Forward Path | Before incident on dichroic mirror | 6000 | 1000 |
| | After transmission through dichroic mirror | 5994 | 999 |
| | (Vignetting in optical component) | 60 | 10 |
| | After reflection on workpiece | 299.7 | 49.95 |
| Return Path | After transmission through dichroic mirror | 299.4 | 49.9 |
| | After reflection on dichroic mirror | 0.30 | 0.05 |
| Detection Position | | Input power (W) to photodetector | |
| | First photodetector | 0.05 | |
| | Second photodetector | 0.30 | |
| | Third photodetector | 359.3 (=299.4+59.9) | |
| | (Vignetting component included) | (59.9) | |
| | Fourth photodetector | 59.9 (=49.9+9.99) | |
| | (Vignetting component included) | (10) | |

FIG. 10

| case | POWER (W) OF FIRST LASER BEAM A | REFLECTION ON WORKPIECE | OUTPUT P3(W) OF THIRD PHOTODETECTOR | OUTPUT P2(W) OF SECOND PHOTODETECTOR | CONTRIBUTION OF REFLECTION | CONTRIBUTION OF OUTPUT |
|---|---|---|---|---|---|---|
| case0 | 0 | — | 0 | 0 | — | — |
| case1 | 500 | ABSENCE | 5 | 0 | 0 | 5 |
| case2 | 1000 | ABSENCE | 10 | 0 | 0 | 10 |
| case3 | 1000 | PRESENCE | 15 | 1 | 5 | 10 |
| case4 | 500 | PRESENCE | 7.5 | 0.5 | 2.5 | 5 |

FIG. 12

| case | POWER (W) OF FIRST LASER BEAM A | REFLECTION ON WORKPIECE OR PROTECTIVE GLASS | OUTPUT P3(W) OF THIRD PHOTODETECTOR | OUTPUT P2(W) OF SECOND PHOTODETECTOR | OUTPUT P3(W) OF SIXTH PHOTODETECTOR | CONTRIBUTION OF REFLECTION FROM WORKPIECE | CONTRIBUTION OF OUTPUT | CONTRIBUTION OF REFLECTION FROM PROTECTIVE GLASS |
|---|---|---|---|---|---|---|---|---|
| case0 | 0 | — | 0 | 0 | 0 | — | — | — |
| case1 | 500 | ABSENCE | 5 | 0 | 0 | 0 | 5 | 0 |
| case2 | 1000 | ABSENCE OF REFLECTION | 10 | 0 | 0 | 0 | 10 | 0 |
| case3 | 1000 | PRESENCE OF REFLECTION ON PROTECTIVE GLASS | 15 | 1 | 0 | 5 | 10 | 1 |
| case4 | 500 | PRESENCE OF REFLECTION ON PROTECTIVE GLASS | 7.5 | 0.5 | 0 | 2.5 | 5 | 1 |
| case5 | 1000 | PRESENCE OF REFLECTION ON WORKPIECE | 15 | 1 | 1 | 5 | 10 | 0 |
| case6 | 500 | PRESENCE OF REFLECTION ON WORKPIECE | 7.5 | 0.5 | 0.5 | 2.5 | 5 | 0 |

LASER PROCESSING HEAD, LASER PROCESSING SYSTEM, AND METHOD OF DETERMINING ABNORMALITY OF LASER PROCESSING SYSTEM

BACKGROUND

1. Technical Field

The present disclosure relates to a laser processing head, particularly a laser processing head that emits two laser beams having different wavelengths, a laser processing system including the laser processing head, and a method of determining abnormality of the laser processing system.

2. Description of the Related Art

A laser processing system performs laser processing such as cutting, welding, and drilling of a workpiece. In the laser processing system, a laser processing head irradiates a workpiece with a laser beam emitted from a laser oscillator and guided through an optical fiber. The laser processing head is provided with a condensing optical system for condensing the laser beam and irradiating the workpiece with the laser beam.

During the laser processing, spatter or the like in which the workpiece is melted and scattered may adhere to an optical component provided in the laser processing head. When spatter adheres in this manner, the laser beam is scattered inside the laser processing head, and the workpiece cannot be irradiated with the laser beam with desired power, which may lead to a processing defect and deterioration in processing quality.

In order to cope with such a problem, for example, PTL 1 discloses a laser processing system that generates an inspection laser beam having a lower output than a processing laser beam by a laser oscillator and irradiates a workpiece with the inspection laser beam via a laser processing head. Inside the laser processing head, a light receiver that receives return light reflected by the workpiece is provided. On the basis of intensity of the return light detected by the light receiver, a degree of contamination of a protective glass covering a light irradiation port of the laser processing head is determined, and a degree of power reduction of the processing laser beam with which the workpiece is irradiated is determined. When the degree of power reduction is small, an output of the processing laser beam is corrected to perform the laser processing, and when the degree of power reduction is large, the laser processing is interrupted.

CITATION LIST

Patent Literature

PTL 1: Unexamined Japanese Patent Publication No. 2016-097412

SUMMARY

In recent years, a hybrid laser processing system using two types of laser beams having different wavelengths, such as near-infrared light and blue light, for example, has been known. The hybrid laser processing system combines two types of laser beams having different wavelengths on an identical optical axis by a laser processing head, condenses the combined two types of laser beams, and irradiates the workpiece with the condensed laser beams. The hybrid laser processing system can utilize strengths of the laser beams and complement limitations of the laser beams, and thus has more advantages than a conventional laser processing system using only one type of laser beam.

In such a hybrid laser processing system, it is also required to determine an internal state of the laser processing head as in PTL 1. There has also been a demand for detecting reflected return light from a workpiece and determining a processing state of the workpiece on the basis of a result of the detection.

However, in the conventional configuration disclosed in PTL 1, it is difficult to determine the processing state of the workpiece and the internal state of the laser processing head by separating reflected return light from the workpiece and vignetting light in an optical component inside the laser processing head. In particular, in the hybrid laser processing system, a plurality of optical components are disposed in an optical path of each laser beam, and it is more difficult to determine the state of these optical components.

The present disclosure has been made in view of the above points, and an object of the present disclosure is to provide a laser processing head that irradiates a workpiece with laser beams having different wavelengths and a laser processing system including the laser processing head, the laser processing head being capable of determining a processing state of the workpiece on the basis of reflected return light.

A laser processing head of the present disclosure includes a housing, and a plurality of optical components disposed in the housing, in which the housing includes a first light entrance port through which a first laser beam enters, a second light entrance port through which the second laser beam enters, a light irradiation port through which the first laser beam and the second laser beam are emitted to outside, and a partition wall that separates an optical path of the first laser beam entering through the first light entrance port from an optical path of the second laser beam entering through the second light entrance port, the second laser beam has a wavelength shorter than a wavelength of the first laser beam, the laser processing head includes a first photodetector provided around the optical path of the first laser beam entering through the first light entrance port, and a second photodetector provided around the optical path of the second laser beam entering through the second light entrance port, the first photodetector is disposed opposite to the second photodetector across the partition wall, the first photodetector receives light in a second wavelength band including the wavelength of the second laser beam, the second photodetector receives light in a first wavelength band including the wavelength of the first laser beam, and at least some of the plurality of optical components are disposed in the housing to make an optical axis of the first laser beam emitted from the light irradiation port and an optical axis of the second laser beam substantially coincide with each other by changing the optical path of at least one of the first laser beam or the second laser beam.

A laser processing system of the present disclosure includes the laser processing head, a first laser oscillator that emits the first laser beam, a second laser oscillator that emits the second laser beam, a first optical fiber that is connected to the first light entrance port and transmits the first laser beam emitted from the first laser oscillator to the laser processing head, and a second optical fiber that is connected to the second light entrance port and transmits the second laser beam emitted from the second laser oscillator to the laser processing head, in which the laser processing head irradiates a workpiece with at least one of the first laser beam or the second laser beam.

A method of determining abnormality of the present disclosure is a method of determining presence or absence of abnormality in the laser processing system, the method including, when the workpiece is irradiated with the second laser beam, determining whether there is abnormality in a processing state of the workpiece or a state of an optical component in the housing based on an output signal of the first photodetector, and when the workpiece is irradiated with the first laser beam, determining whether there is abnormality in the processing state of the workpiece or the state of the optical component in the housing based on an output signal of the second photodetector.

The present disclosure allows determination of the processing state of the workpiece in the hybrid laser processing system.

BRIEF DESCRIPTION OF THE DRAWINGS

FIG. 9 is an example of outputs of the first to fourth photodetectors when the workpiece is irradiated with the first laser beam and the second laser beam;

FIG. 10 is an example of outputs of the second and third photodetectors when the workpiece is irradiated with the first laser beam according to a second exemplary embodiment;

FIG. 12 is an example of outputs of the second photodetector, the third photodetector, and a sixth photodetector when the workpiece is irradiated with the first laser beam.

DETAILED DESCRIPTIONS

Hereinafter, exemplary embodiments of the present disclosure will be described with reference to the drawings. Note that the following description of the preferred exemplary embodiments is merely exemplary in nature, and is not intended to limit the present disclosure, its application, or its use.

First Exemplary Embodiment

[Configuration of Laser Processing System]

Figure 1:
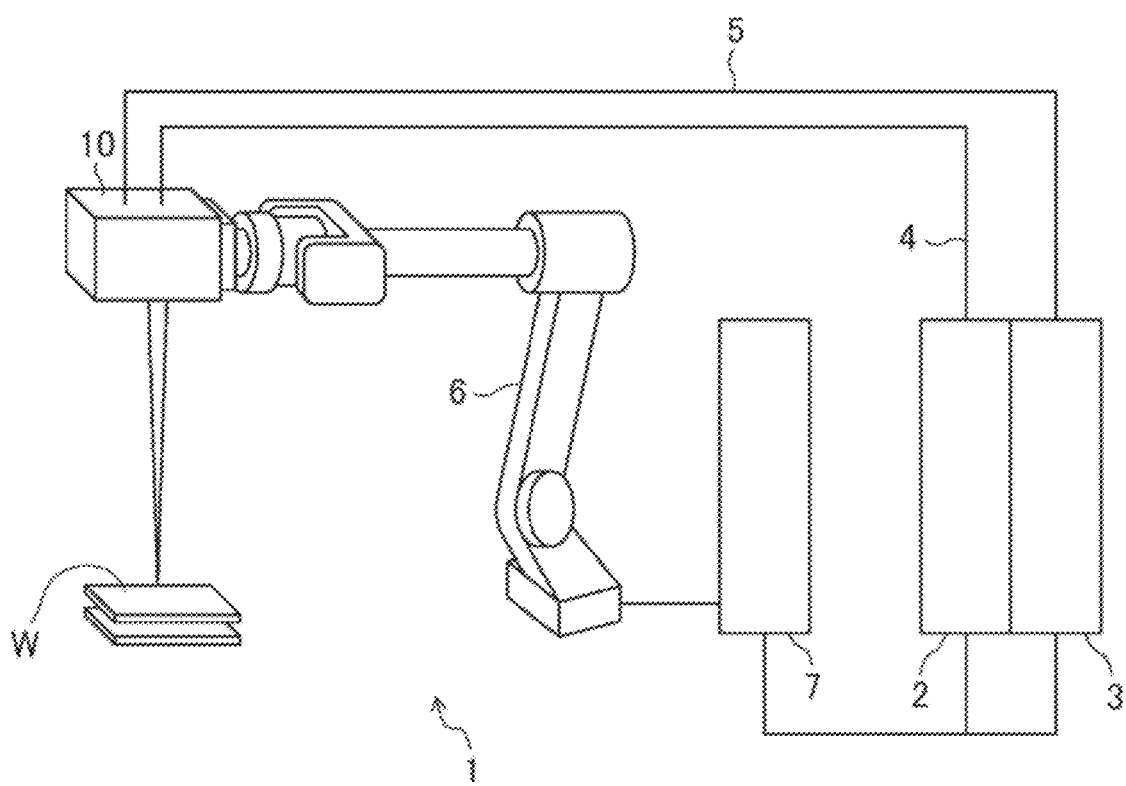
FIG. 1 is a schematic configuration diagram of a laser processing system according to a first exemplary embodiment.

FIG. 1 illustrates laser processing system (laser processing apparatus) 1 according to the present exemplary embodiment. Laser processing system 1 is a hybrid laser processing system using two types of laser beams having different wavelengths, and performs laser processing such as cutting, welding, and drilling of workpiece W.

Laser processing system 1 includes laser processing head (laser irradiation head) 10, first laser oscillator 2 and second laser oscillator 3, first optical fiber 4, second optical fiber 5, manipulator 6, and control device 7.

First laser oscillator 2 emits first laser beam A. Second laser oscillator 3 emits second laser beam B. First laser beam A and second laser beam 13 have different wavelengths. First laser beam A is near-infrared light having a wavelength ranging from about 900 nm to 1200 nm inclusive. Second laser beam B is near-infrared light having a wavelength ranging from about 400 nm to 450 nm inclusive. In general, near-infrared light is applied to laser processing, but in recent years, blue light is also being applied to laser processing because of its good absorption rate to copper. Second laser beam B may be green light (wavelength: from about 450 nm to 550 nm inclusive).

First optical fiber 4 transmits first laser beam A from first laser oscillator 2 to laser processing head 10. Second optical fiber 5 transmits second laser beam B from second laser oscillator 3 to laser processing head 10.

Laser processing head 10 irradiates surface W1 of workpiece W with at least one of first laser beam A or second laser beam B. In this case, an optical axis of first laser beam A directed from laser processing head 10 toward workpiece W and an optical axis of second laser beam B are made identical. For example, when surface W1 of workpiece W is simultaneously irradiated with both first laser beam A and second laser beam B, workpiece W is irradiated with first laser beam A and second laser beam B in a state where the optical axis of first laser beam A and the optical axis of second laser beam B are overlapped with each other. Details of laser processing head 10 will be described later.

Laser processing head 10 is attached to a distal end of manipulator 6, and laser processing head 10 is moved. Control device 7 controls operation of manipulator 6 and oscillation of laser beams A, B by laser oscillators 2, 3. Control device 7 may control operation of an actuator described later inside laser processing head 10.

[Configuration of Laser Processing Head]

Figure 2:
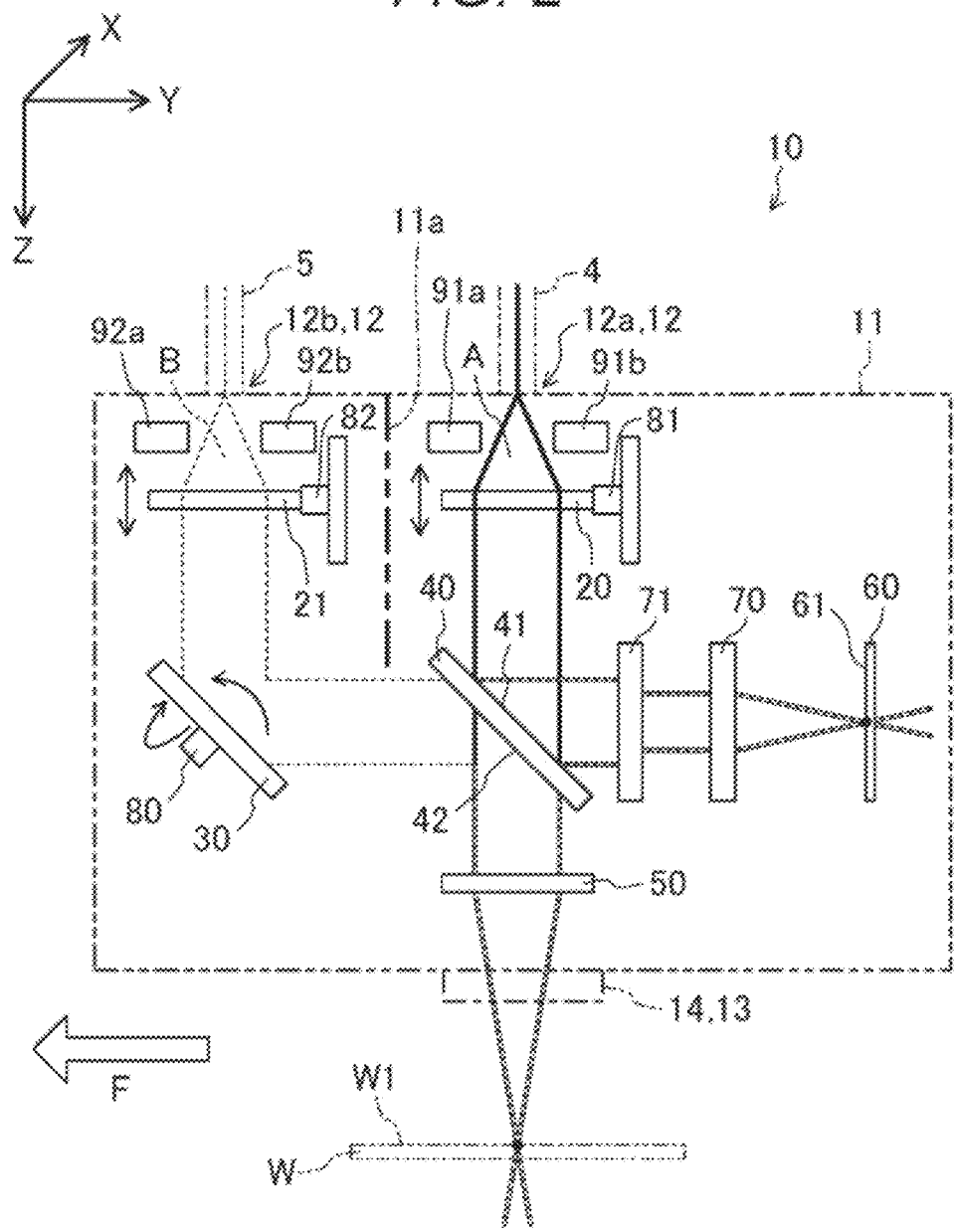
FIG. 2 is a schematic configuration diagram illustrating an internal structure of a laser processing head.

FIG. 2 illustrates an internal structure of laser processing head 10. Note that X, Y, Z in FIG. 2 indicate directions in an orthogonal coordinate system, X, Y are horizontal directions of front, rear, left, and right, and Z is an up-down direction (vertical direction). A direction in which the optical axis (virtual ray as representative of light flux in each of laser beams A. B) of each of laser beams A, B extends is referred to as an "optical axis direction". The optical axis direction is not always constant in the orthogonal coordinate systems X, Y, Z. and may change in accordance with a progress of each of laser beams A, B.

Laser processing head 10 condenses first laser beam A and second laser beam H by a condensing optical system provided in housing 11, and irradiates workpiece W with first laser beam A and second laser beam B. Laser processing head 10 includes, as the condensing optical system, first collimator lens 20, second collimator lens 21, bend mirror 30, dichroic mirror 40, and workpiece-side condensing lens 50. Laser processing head 10 includes mirror-side actuator 80 as a part of an adjuster, first lens-side actuator 81 as a part of the adjuster, and second lens-side actuator 82 as a part of the adjuster.

Laser processing head 10 includes third photodetector 91a, first photodetector 91b, second photodetector 92a, and fourth photodetector 92b. Further, laser processing head 10 includes image sensor (fifth photodetector) 60, detection-side condensing lens 70, and aperture 71. An arrangement relationship of first to fourth photodetectors 91b. 92a. 91a. 92b in housing 11 and a function of each photodetector will be described in detail later.

Housing 11 is provided with first light entrance port 12a and second light entrance port 12b on an upper side in Z direction. First light entrance port 12a and second light entrance port 12b are provided with a predetermined space from each other. First optical fiber 4 is connected to first light entrance port 12a, and first laser beam A enters inside housing 11 through first light entrance port 12a. Second optical fiber 5 is connected to second light entrance port 12b, and second laser beam B enters inside housing 11 through second light entrance port 12b. Note that first light entrance port 12a and second light entrance port 12b may be collectively referred to as entrance part 12.

Housing 11 is provided with light irradiation port (irradiation part) 13 on a lower side in Z direction. Surface W1 of workpiece W is irradiated with first laser beam A and second laser beam B through protective glass 14 provided in light irradiation port 13.

Housing 11 is provided with partition wall 11a. Partition wall 11a is provided between first light entrance port 12a and second light entrance port 12b in Y direction. In Z direction, first collimator lens 20 and second collimator lens extend from an upper inner wall of housing 11 to near first collimator lens and second collimator lens 21. Partition wall 11a separates an optical path of first laser beam A entering through first light entrance port 12a from an optical path of second laser beam B entering through second light entrance port 12b.

First collimator lens 20 converts first laser beam A into a parallel ray. Second collimator lens 21 converts second laser beam B into a parallel ray. First laser beam A and second laser beam B travel straight in Z direction in parallel with each other until first laser beam A and second laser beam B are incident on first collimator lens 20 and second collimator lens 21, respectively.

Bend mirror 30 changes the optical axis of second laser beam B parallel to the optical axis of first laser beam A to a direction intersecting the optical axis of first laser beam A, specifically, to a direction orthogonal to the optical axis of first laser beam A (Y direction).

Dichroic mirror 40 is a mirror that transmits most of light in a specific wavelength region and reflects most of light in the other wavelength regions. In the present exemplary embodiment, dichroic mirror 40 transmits most of first laser beam A incident from reverse surface 41 substantially straight toward front surface 42, and reflects most of second laser beam B incident from front surface 42 substantially at a right angle toward front surface 42. On the other hand, dichroic mirror 40 reflects the rest of first laser beam A incident from reverse surface 41 substantially at the right angle toward reverse surface 41, and transmits the rest of second laser beam B incident from front surface 42 substantially straight toward reverse surface 41.

Light irradiation port 13 is disposed on an advancing side in the optical axis direction of most of first laser beam A transmitted through dichroic mirror 40 and most of second laser beam B reflected by dichroic mirror 40. That is, dichroic mirror 40 transmits most of first laser beam A toward workpiece W and reflects most of second laser beam 3 toward workpiece W.

Most of laser beams A, B are, for example, about 95% to 99.9% of laser beams A, B before being incident on dichroic mirror 40 in terms of energy. The rest of laser beams A, B is, for example, about 0.1% to 5% of laser beams A, B before being incident on dichroic mirror 40 in terms of energy.

Workpiece-side condensing lens 50 is disposed between dichroic mirror 40 and workpiece W in the optical axis direction. Workpiece-side condensing lens 50 condenses each of first laser beam A and second laser beam B. Surface W1 of workpiece W is irradiated with condensed first laser beam A and second laser beam B through light irradiation port 13. Workpiece-side condensing lens 50 may have a chromatic aberration correction function. In this case, condensing positions of first laser beam A and second laser beam B transmitted through workpiece-side condensing lens 50 substantially coincide with each other in Z direction.

Image sensor (fifth photodetector) 60 is an imaging element that photoelectrically converts brightness and darkness of light formed on light receiving surface 61 into an amount of charge, reads the charge, and converts the charge into an electric signal. Image sensor 60 is disposed on a side of reverse surface 41 of dichroic mirror 40. Specifically, image sensor 60 is disposed on the advancing side in the optical axis direction of the rest of first laser beam A reflected by dichroic mirror 40 and the rest of second laser beam B transmitted through dichroic mirror 40. That is, image sensor 60 receives the rest of first laser beam A reflected by dichroic mirror 40 and the rest of second laser beam B transmitted through dichroic mirror 40 on light receiving surface 61.

Aperture 71 is disposed between dichroic mirror 40 and detection-side condensing lens 70 in the optical axis direction.

Detection-side condensing lens 70 is disposed between aperture 71 and image sensor 60 in the optical axis direction. Detection-side condensing lens 70 condenses each of first laser beam A and second laser beam B. Then, detection-side condensing lens 70 irradiates light receiving surface 61 of image sensor 60 with each of condensed first laser beam A and second laser beam B. Detection-side condensing lens 70 may have a chromatic aberration correction function. In this case, condensing positions of first laser beam A and second laser beam B transmitted through detection-side condensing lens 70 substantially coincide with each other in Y direction.

A size and curvature of detection-side condensing lens 70 and a distance between detection-side condensing lens 70 and image sensor 60 are set so as to correspond to a condensing state of first laser beam A with which surface W1 of workpiece W is irradiated. That is, the condensing state of first laser beam A with which light receiving surface 61 of image sensor 60 is irradiated corresponds to the converging state of first laser beam A with which surface W1 of workpiece W is irradiated.

Similarly, the size and curvature of detection-side condensing lens 70 and the distance between detection-side condensing lens 70 and image sensor 60 are set so as to correspond to a condensing state of second laser beam B with which surface W1 of workpiece W is irradiated. That is, the condensing state of second laser beam B with which light receiving surface 61 of image sensor 60 is irradiated corresponds to the converging state of second laser beam B with which surface W1 of workpiece W is irradiated.

For example, when a spot diameter (detection-side first spot diameter Daj) of first laser beam A increases on light receiving surface 61 of the image sensor 60, a spot diameter (workpiece-side first spot diameter Dai) of first laser beam A with which surface W1 of workpiece W is irradiated also increases. When the condensing position of second laser beam B is shifted on light receiving surface 61 of image sensor 60, the condensing position of second laser beam B with which surface W1 of workpiece W is irradiated is also shifted. In the present exemplary embodiment, the "spot diameter" means a diameter of a laser beam on an arbitrary image plane (for example, surface W1 of workpiece W or light receiving surface 61 of image sensor 60), and is not necessarily limited to a diameter at a converging spot of the laser beam.

Mirror-side actuator 80 changes inclination of bend mirror 30. Mirror-side actuator 80 is configured by, for example, a tilt shaft and a motor that rotates the tilt shaft. A change of inclination of bend mirror 30 by mirror-side actuator 80 changes a direction of the optical axis of second laser beam B bent by bend mirror 30. As a result, the condensing position of second laser beam B changes.

First lens-side actuator 81 moves first collimator lens 20 in the optical axis direction (Z direction). First lens-side actuator 81 is configured by, for example, a linear motor. Second lens-side actuator 82 moves second collimator lens 21 in the optical axis direction (Z direction). Second lens-side actuator 82 is configured by, for example, a linear motor. The movement of collimator lenses 20, 21 in the optical axis direction (Z direction) by lens-side actuators 81, 82 changes spot diameters of first laser beam A and second laser beam B described later.

When each of collimator lenses 20, 21 is moved in the optical axis direction (7 direction) by each of lens-side actuators 81, 82, each of collimator lenses 20, 21 does not necessarily move straight in the optical axis direction (Z direction), but may slightly move or slightly tilt in the horizontal direction (X direction and Y direction) orthogonal to the optical axis direction.

As described above, at least some of a plurality of optical components, in this case, bend mirror 30 and dichroic mirror 40 are disposed in housing 11 such that the optical path of second laser beam B is changed and the optical axis of first laser beam A emitted from light irradiation port 13 substantially coincides with the optical axis of second laser beam B.

[Configuration of Image Sensor]

Figure 3:
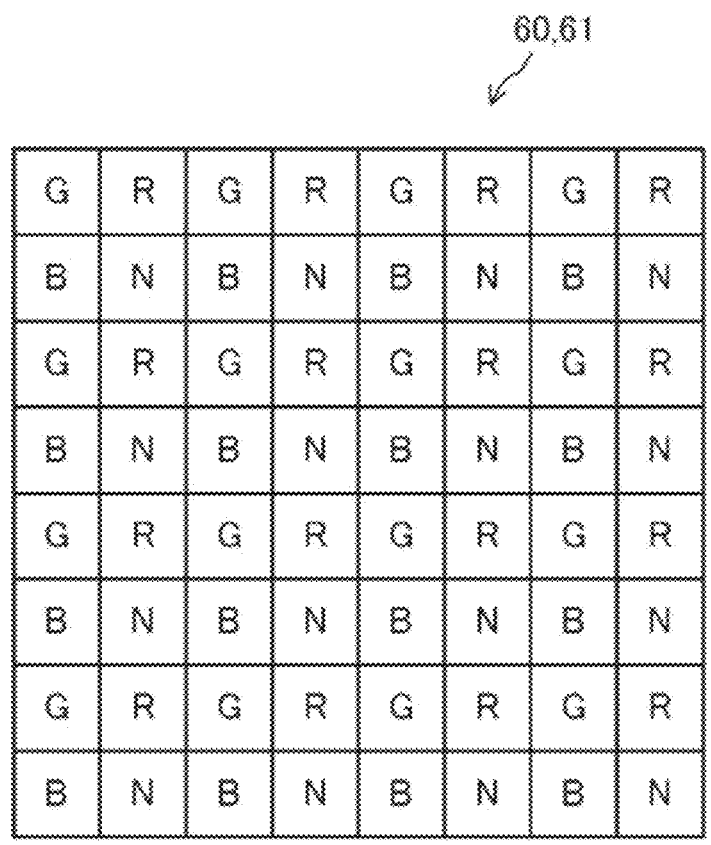
FIG. 3 is a schematic diagram illustrating a pixel structure of an image sensor.
Figure 4:
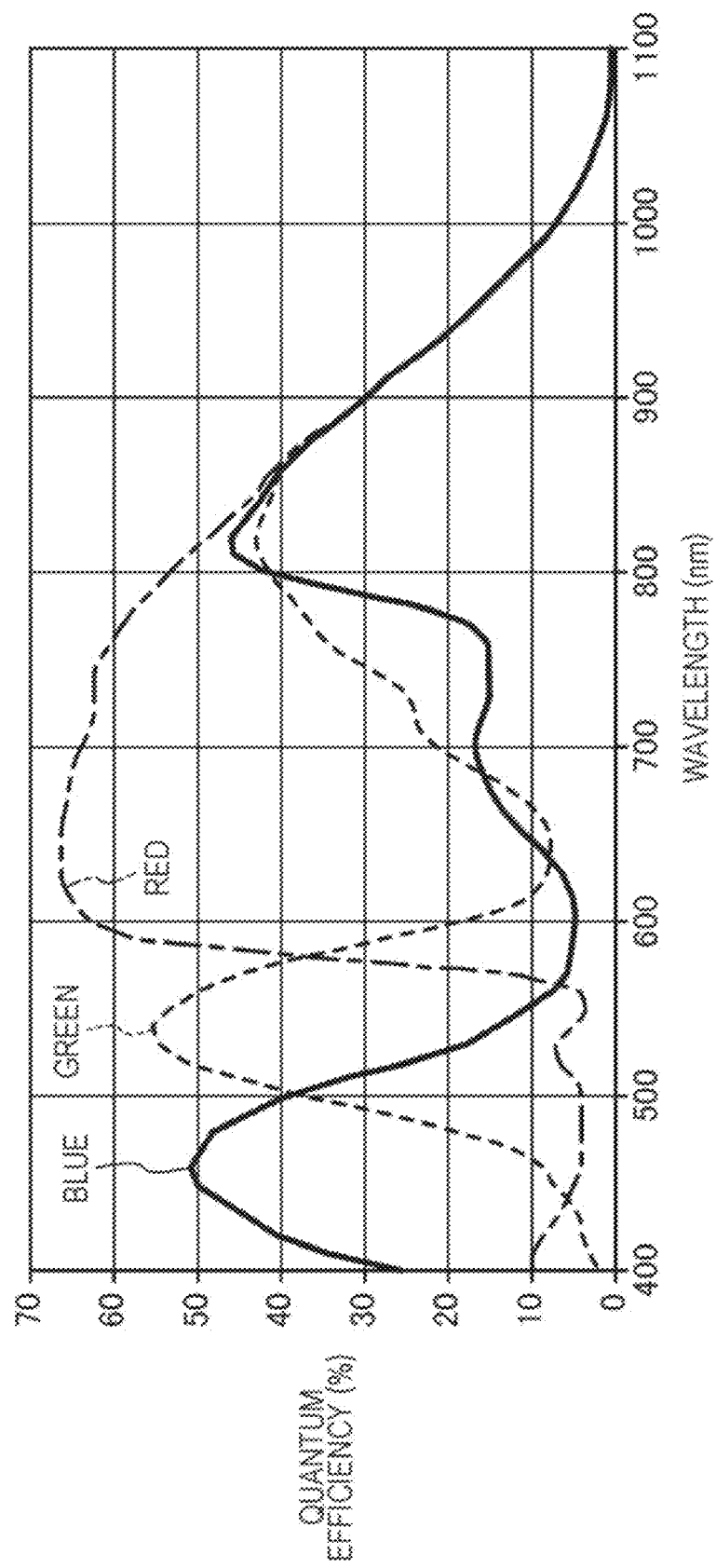
FIG. 4 is a diagram illustrating an example of a relationship between light receiving efficiency and a wavelength of an RGB pixel.

FIG. 3 schematically illustrates a pixel structure of the image sensor. FIG. 4 illustrates a relationship between light receiving efficiency and a wavelength of an RGB pixel.

As illustrated in FIG. 3, image sensor 60 has arrays in units of a total of four pixels including a pixel that receives near-infrared light or infrared light (hereinafter, referred to as N pixel), a pixel that receives red light (hereinafter, referred to as R pixel), a pixel that receives green light (hereinafter, referred to as G pixel), and a pixel that receives blue light (hereinafter, referred to as B pixel). Specifically, the array is a color filter array in which one G pixel is replaced with N pixel as compared with a known Bayer array.

As illustrated in FIG. 4, the R pixel has high quantum efficiency of photoelectrically converting light having a wavelength band ranging from about 600 nm to 850 nm inclusive, and efficiently converts light of normal red light (from about 600 nm to 700 nm inclusive) into an electrical signal. The G pixel has high quantum efficiency of photo- electrically converting light having a wavelength band ranging from about 500 nm to 550 nm inclusive, and efficiently converts light of normal green light (from about 500 nm to 550 nm inclusive) into an electrical signal. The B pixel has high quantum efficiency of photoelectrically converting light having a wavelength band ranging from about 400 nm to 500 nm inclusive, and efficiently converts light of normal blue light (from about 420 n to 480 nm inclusive) into an electrical signal. Although not illustrated, the N pixel has high quantum efficiency of photoelectrically converting light having a wavelength band ranging from about 900 nm to 1200 nm inclusive, and efficiently converts light of near-infrared light or infrared light (from about 900 nm to 1200 nm inclusive) into an electrical signal.

As described above, the wavelength of first laser beam A ranges from about 900 nm to 1200 nm inclusive, and the wavelength of second laser beam B ranges from about 400 nm to 450 nm inclusive. Thus, by using image sensor 60 illustrated in FIG. 3, first laser beam A and second laser beam B transmitted through detection-side condensing lens 70 can be reliably converted into electric signals. Furthermore, by appropriately setting a size of each pixel, it is possible to grasp a two-dimensional distribution of each of first laser beam A and second laser beam B on light receiving surface 61. As will be described later, the condensing positions and spot diameters of first laser beam A and second laser beam B on surface W1 of workpiece W can be corrected on the basis of the two-dimensional distribution and the spot diameters of first laser beam A and second laser beam B on light receiving surface 61.

In terms of reliably converting each of first laser beam A and second laser beam 13 into an electric signal, for example, the R pixels illustrated in FIG. 3 may be replaced with B pixels, and the G pixels may be replaced with N pixels. That is, only two types of B pixels and N pixels may be arranged in a cyclical manner. When second laser beam B is green light, the B pixels may be replaced with G pixels.

[Monitoring and Adjustment of Condensing State]

When laser processing is actually performed on workpiece W, it is not possible to monitor the condensing state of each of first laser beam A and second laser beam B on surface W1. In the present exemplary embodiment, as described above, the condensing states of first laser beam A and second laser beam B with which light receiving surface 61 of image sensor 60 is irradiated correspond to the condensing states of first laser beam A and second laser beam B with which surface W1 of workpiece W is irradiated. That is, the light condensing state on surface W1 of workpiece W can be monitored on the basis of a spot image of first laser beam A and second laser beam B emitted onto light receiving surface 61 of image sensor 60.

Figure 5A:
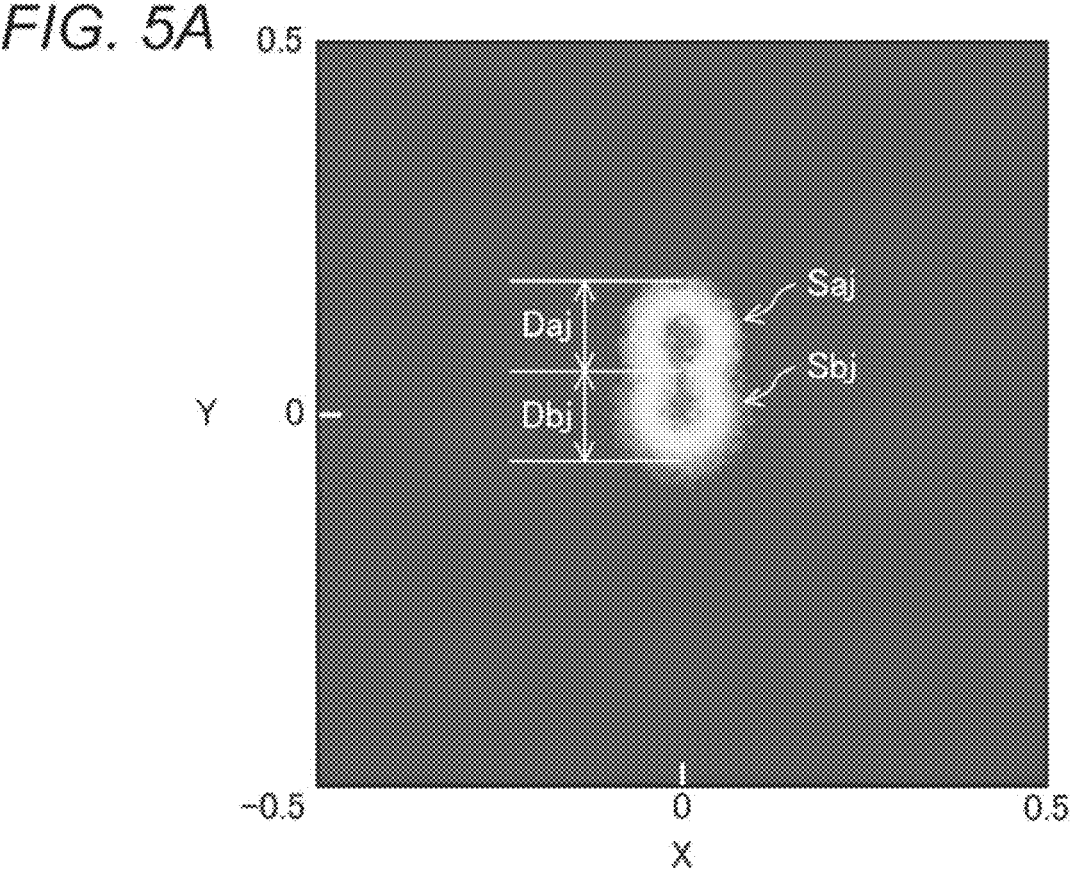
FIG. 5A is an example of an image illustrating spots of a first laser beam and a second laser beam condensed on a light receiving surface of the image sensor.
Figure 5B:
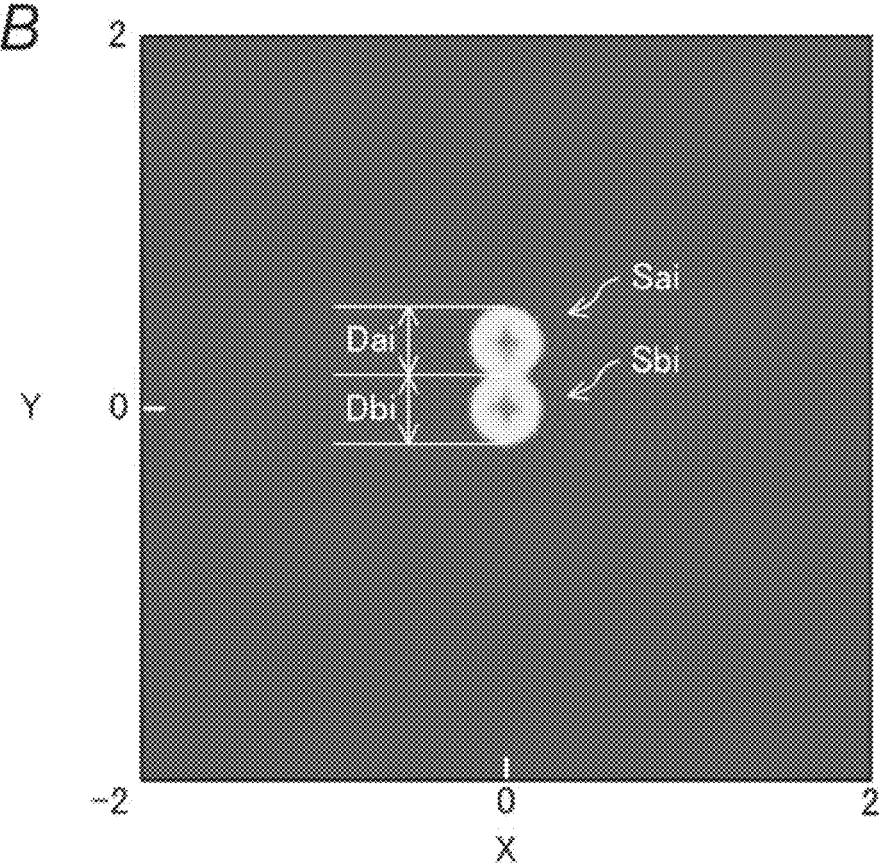
FIG. 5B is an example of an image illustrating spots of the first laser beam and the second laser beam condensed on a surface of a workpiece.

FIG. 5A illustrates an example of the spot image of the first laser beam and the second laser beam condensed on the light receiving surface of the image sensor, and FIG. 5B illustrates an example of the spot image of the first laser beam and the second laser beam condensed on the surface of the workpiece.

As will be described later, by adjusting and appropriately setting the arrangement relationship of the optical components inside laser processing head 10, first laser beam A and second laser beam B are condensed to coincide with each other or be in proximity to each other on surface W1 of workpiece W as illustrated in FIG. 5B. Workpiece-side first spot Sai of first laser beam A and workpiece-side second spot Sbi of second laser beam B are both adjusted to have sizes suitable for processing. Workpiece-side first spot diameter Dai of first laser beam A and workpiece-side second spot diameter Dbi of second laser beam B are both adjusted to have sizes suitable for processing.

The light condensing positions of first laser beam A and second laser beam B on surface W1 of workpiece W can be adjusted on the basis of an image of first laser beam A and second laser beam B acquired by image sensor 60.

For example, when the condensing position of first laser beam A and the condensing position of second laser beam B are shifted due to a misalignment of the optical axes of the two laser beams, mirror-side actuator 80 can be tilted to match the condensing positions of the two laser beams. For example, in a case where the spot image of first laser beam A emitted onto light receiving surface 61 of image sensor 60 is defocused, first lens-side actuator 81 is driven to cancel a defocus state. In this way, first laser beam A can be focused on surface W1 of workpiece W. Similarly, in a case where the spot image of second laser beam B emitted onto light receiving surface 61 of image sensor 60 is defocused, second lens-side actuator 82 is driven to cancel a defocus state. In this way, second laser beam H can be focused on surface W1 of workpiece W.

[Configurations of First to Fourth Photodetectors]

Figure 6A:
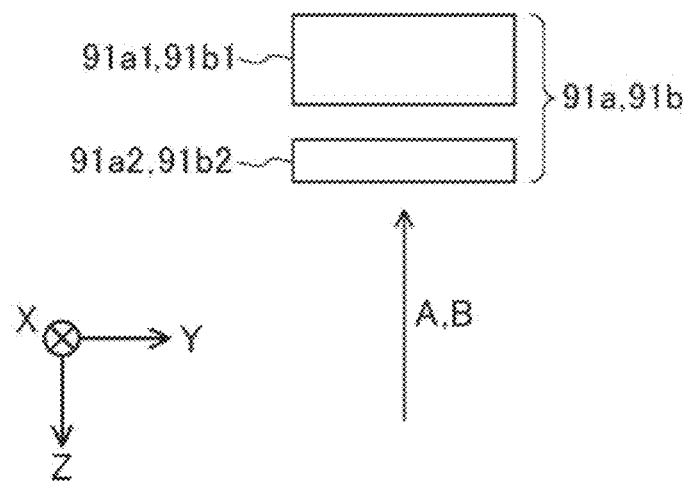
FIG. 6A is a schematic diagram of a first photodetector and a third photodetector.
Figure 6B:
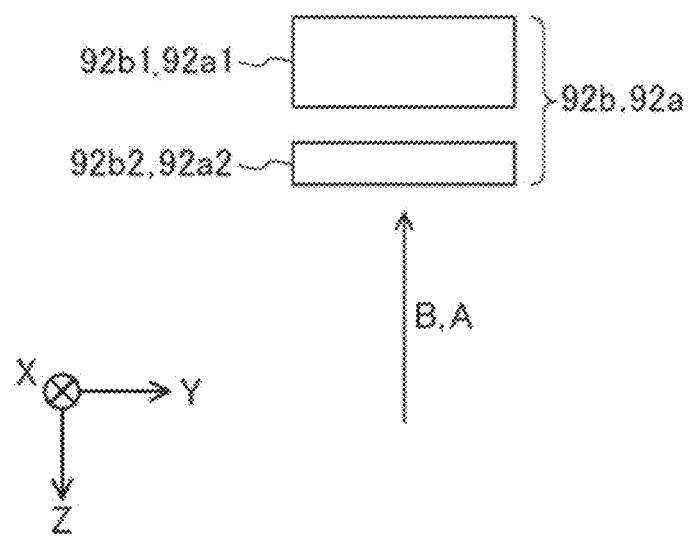
FIG. 6B is a schematic diagram of a second photodetector and a fourth photodetector.

FIG. 6A schematically illustrates configurations of the first photodetector and the third photodetector, and FIG. 6B schematically illustrates configurations of the second photodetector and the fourth photodetector.

As illustrated in FIG. 6A, first photodetector 91b is configured by photodiode 91b1 and wavelength selection filter 91b2. Wavelength selection filter 91b2 is configured to transmit light in a second wavelength band including a wavelength of blue light and block light of other wavelengths. Third photodetector 91a is configured by photodiode 91a1 and wavelength selection filter 91a2. Wavelength selection filter 91a2 is configured to transmit light in a first wavelength band including a wavelength of near-infrared light or infrared light and block light of other wavelengths.

As illustrated in FIG. 6B, second photodetector 92a is configured by photodiode 92a1 and wavelength selection filter 92a2. Wavelength selection filter 92a2 is configured to transmit light in a first wavelength band including a wavelength of near-infrared light or infrared light and block light of other wavelengths. Fourth photodetector 92b is configured by photodiode 92b1 and wavelength selection filter 92b2. Wavelength selection filter 92b2 is configured to transmit light in the second wavelength band including a wavelength of blue light and block light of other wavelengths.

As will be described later, each of first to fourth photodetectors 91b, 92a, 91a, 92b needs to be disposed at a position to be receivable of first laser beam A or the second laser beam reflected by workpiece W or an optical component in housing 11, for example, the protective glass. Therefore, as illustrated in FIG. 2, first photodetector 91b and third photodetector 91a are provided around the optical path of first laser beam A entering through first light entrance port 12a. Second photodetector 92a and fourth photodetector 92b are provided around the optical path of second laser beam B entering through second light entrance port 12b.

Partition wall 11a is provided between first photodetector 91b and third photodetector 91a and between second photodetector 92a and fourth photodetector 92b. In this way, the optical path that is receivable by first photodetector 91b and third photodetector 91a and the optical path that is receivable by second photodetector 92a and fourth photodetector 92b are separated.

In the present exemplary embodiment, the first wavelength band refers to a range of 900 nm to 1200 nm inclusive, and the second wavelength band refers to a range of 400 nm to 600 nm inclusive. The present disclosure is not limited to these ranges. As will be described later, each of first to fourth photodetectors 91b. 92a, 91a, 92b receives first laser beam A or the second laser beam reflected by workpiece W or an optical component in housing 11, for example, the protective glass. However, when a metal is irradiated with a laser beam, an interaction with plasmon occurs on a surface of the metal, and a wavelength of reflected light may be shifted. Each of first to fourth photodetectors 91b, 92a, 91a, 92b needs to be receivable of the reflected light having the wavelength shifted in this manner.

It is therefore necessary to set a wavelength region in which first photodetector 91b and fourth photodetector 92b are receivable of light to be the same as or wider than a wavelength region of second laser beam B, for example, to be the second wavelength band described above. Similarly, it is necessary to set a wavelength region in which second photodetector 92a and third photodetector 91a are receivable of light to be the same as or wider than a wavelength region of first laser beam A, for example, to be the first wavelength band described above.

That is, first photodetector 91b is provided around the optical path of first laser beam A. and receives second laser beam B reflected by workpiece W or the like. Second photodetector 92a is provided around the optical path of second laser beam B, and receives first laser beam A reflected by workpiece W or the like. Third photodetector 91a is provided around the optical path of first laser beam A, and receives first laser beam A reflected by workpiece W or the like. Fourth photodetector 92b is provided around the optical path of second laser beam B. and receives second laser beam B reflected by workpiece W or the like.

Wavelength selection filters 91a2, 92a2 may transmit light in the first wavelength band and a wavelength longer than the first wavelength band and block light in a wavelength region shorter than the first wavelength band. Light receiving sensitivity only needs to be less than or equal to a predetermined value with respect to the light in the second wavelength band. Similarly, wavelength selection filters 91a2, 92a2 may transmit light in the second wavelength band and a wavelength shorter than the second wavelength band and block light of a wavelength region longer than the second wavelength band. Light receiving sensitivity only needs to be less than or equal to a predetermined value with respect to the light in the first wavelength band.

Note that, in the examples illustrated in FIGS. 6A, 6B, each of first to fourth photodetectors 91b, 92a, 91a, 92b is configured by the photodiode and the wavelength selection filter provided separately from the photodiode, but the present disclosure is not limited to this configuration. The first to fourth photodetectors may be integrated by directly forming the wavelength selection filter on the surface of the photodiode, or the like. Photodiodes 91b1, 91a1, 92a1, 92b1 may be photodiode arrays.

[Procedure for Determining Abnormality of Laser Processing System]

Figure 7:
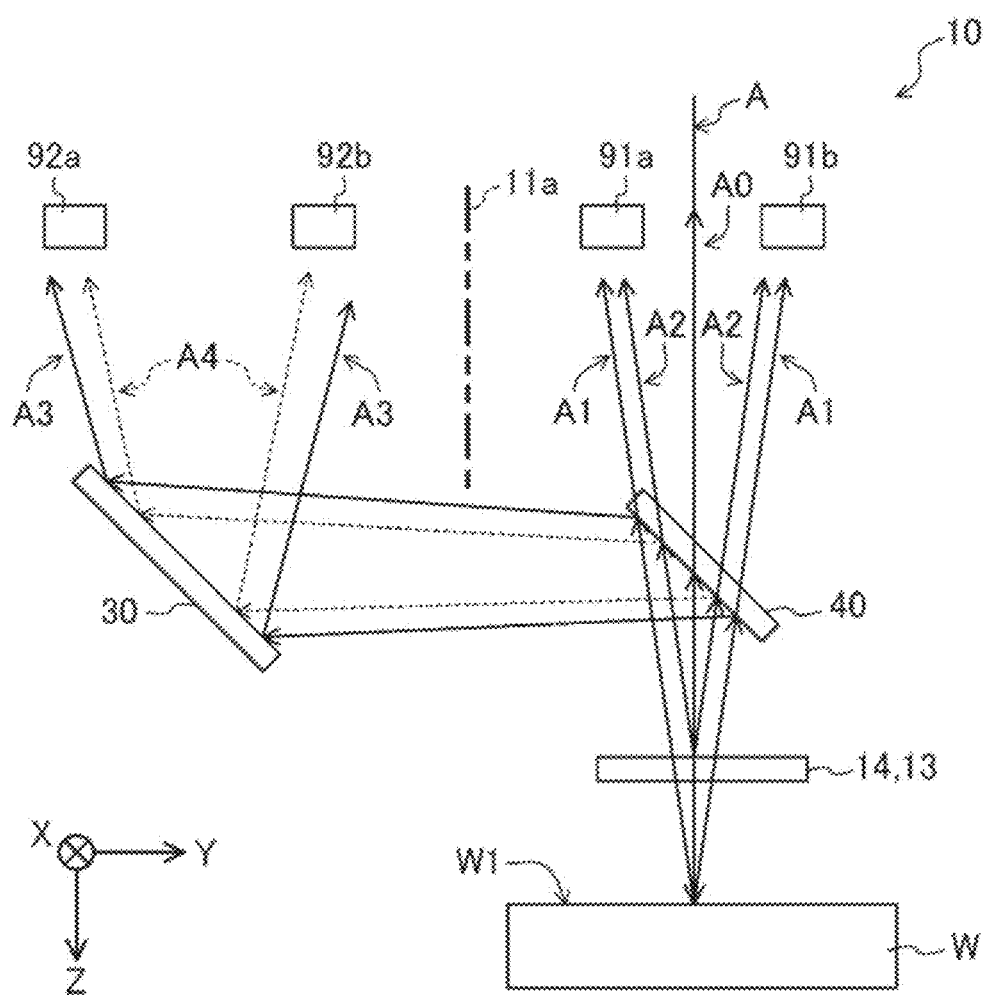
FIG. 7 is a schematic diagram illustrating a state of reflected light when the workpiece is irradiated with the first laser beam.
Figure 8:
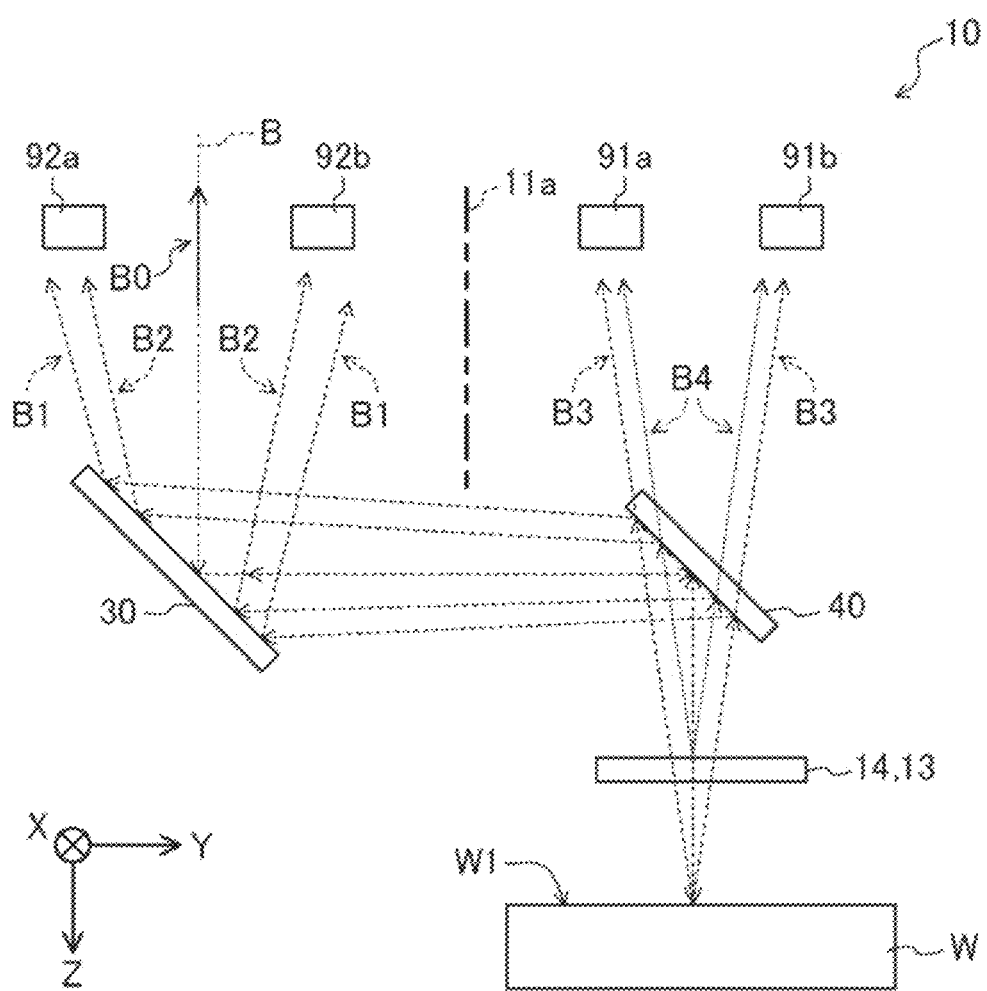
FIG. 8 is a schematic diagram illustrating a state of reflected light when the workpiece is irradiated with the second laser beam.

FIG. 7 schematically illustrates a state of reflected light when the workpiece is irradiated with the first laser beam. FIG. 8 schematically illustrates a state of reflected light when the workpiece is irradiated with the second laser beam. FIG. 9 is an example of outputs of the first to fourth photodetectors when the workpiece is irradiated with the first laser beam and the second laser beam.

For convenience of description, FIGS. 7, 8 illustrate only first to fourth photodetectors 91b, 92a, 91a, 92b, bend mirror 30, dichroic mirror 40, and protective glass 14 among the components constituting laser processing head 10.

As described above, by monitoring a processing state of workpiece W during laser processing and detecting an abnormality in laser processing system 1, it is possible to suppress occurrence of processing abnormality and deterioration in processing quality. Examples of the abnormality of laser processing system 1 include abnormality of an optical component inside laser processing head 10 and abnormality of first optical fiber 4 and second optical fiber 5. In addition, output abnormality of first laser oscillator 2 and second laser oscillator 3 is also included.

However, inside laser processing head 10 that irradiates workpiece W with first laser beam A and second laser beam B, reflected return light from workpiece W and vignetting light in an optical component such as protective glass 14 are mixed. Each light includes a component caused by first laser beam A and a component caused by second laser beam B.

As disclosed in PTL 1, by simply providing the photodetector inside laser processing head 10, the components cannot be successfully separated, and it is difficult to determine the processing state of workpiece W and the state of the optical components inside laser processing head 10 as described above.

Therefore, in laser processing head 10 according to the present exemplary embodiment, first to fourth photodetectors 91b, 92a, 91a, 92b are disposed at the above-described positions in housing 11. Light detection functions of first to fourth photodetectors 91b, 92a. 91a, 92b, specifically, the wavelength bands of receivable light are set as described above.

In this way, the processing state of workpiece W and the state of the optical components inside laser processing head 10 can be determined on the basis of intensity of the reflected light detected by each of first to fourth photodetectors 91b. 92a, 91a, 92b. In the present exemplary embodiment, a case where the processing state of workpiece W is determined during laser welding will be described.

In laser welding of workpiece W, when a welding defect occurs, irregularities of surface W1 of workpiece W change as compared with a normal portion. Therefore, intensity of the reflected return light from workpiece W also changes. For example, when the intensity of the reflected return light from workpiece W increases to a predetermined value or more, it can be determined that welding abnormality has occurred.

When surface W1 of workpiece W is irradiated with first laser beam A, some components of the reflected return light are generated as illustrated in FIG. 7.

First, the return light reflected by workpiece W returns along the original optical path, passes through dichroic mirror 40, and returns to first light entrance port 12a. Further, the reflected return light may return to first laser oscillator 2 through first optical fiber 4. This return light component is denoted by A0.

Surface W1 of workpiece W is not necessarily flat. Irregularities are also formed on a surface of a weld bead (not shown) formed during welding. Therefore, the reflected return light from workpiece W is scattered, and return light component A1 directed to first light entrance port 12a without passing through the original optical path is generated.

When a surface of protective glass 14 is contaminated by spatter or the like, a part of first laser beam A is reflected also on the surface of protective glass 14 to generate return light component A2 (hereinafter, also referred to as vignetting component A2). Vignetting component A2 is transmitted through dichroic mirror 40 and directed to first light entrance port 12a. Note that similar reflected return light (vignetting light) can be generated not only in protective glass 14 but also in each of the optical components disposed in the optical path of first laser beam A in housing 11.

As described above, dichroic mirror 40 has a finite reflectance (for example, one several thousandth) for first laser beam A. Thus, a part of the reflected return light from workpiece W is reflected by dichroic mirror 40 and then, by bend mirror 30, and travels toward second light entrance port 12b. This return light component is denoted by A3. Similarly, a part of the reflected return light from protective glass 14 is reflected by dichroic mirror 40 and then, by bend mirror 30, and travels toward second light entrance port 12b. This return light component is denoted by A4.

When surface W1 of workpiece W is irradiated with second laser beam 3, some components of the reflected return light are also generated. Return light components B0 to B4 illustrated in FIG. 8 correspond to return light components A0 to A4 illustrated in FIG. 7, respectively. Dichroic mirror 40 has a finite transmittance (for example, one several thousandth) for second laser beam B. Thus, optical paths of return light components B0 to B4 do not coincide with optical paths of return light components A0 to A4.

For example, return light component B0 reflected by surface W1 of workpiece W is reflected by dichroic mirror 40 and bend mirror 30, and returns to second light entrance port 12b. Further, return light component B0 may return to second laser oscillator 3 through second optical fiber 5. Return light component B2 (hereinafter, also referred to as vignetting component 132) reflected by the surface of protective glass 14 is reflected by dichroic mirror 40 and bend mirror 30, and returns to second light entrance port 12b.

In this manner, the return light of first laser beam A reflected by workpiece W or protective glass 14 is divided into components A0, A1, A2 directed to first light entrance port 12a and components A3. A4 directed to second light entrance port 12b. The return light of second laser beam B reflected by workpiece W or protective glass 14 is divided into components B3. B4 directed to first light entrance port 12a and components B0, B1, B2 directed to second light entrance port 12b. In general, the reflected return light from protective glass 14 is significantly smaller than the reflected return light from workpiece W. This is because a reflectance of the laser beam on the surface of protective glass 14 is extremely smaller than a reflectance of the laser beam on surface W1 of workpiece W. A reflectance on a surface of optical components other than protective glass 14 is also generally smaller than the reflectance on surface W1 of workpiece W. Accordingly, return light components A4, B4 are extremely smaller than the other return light components, and are generally negligible.

Therefore, first photodetector 91b provided around the optical path of first laser beam A can detect component B3 among the return light components described above. Third photodetector 91a can detect return light component A1 and vignetting component A2. Second photodetector 92a provided around the optical path of second laser beam B can detect component A3 among the return light components described above. Fourth photodetector 92b can detect return light component B11 and vignetting component B2.

The above observation shows that it is more advantageous to use an output signal of second photodetector 92a than to use an output signal of third photodetector 91a in order to detect the reflected return light of first laser beam A on surface W1 of workpiece W by increasing a signal-noise (S/N) ratio. This is because vignetting component A2 as a reflected return light component from protective glass 14 is mixed in the output signal of third photodetector 91a. For a similar reason, it is more advantageous to use an output signal of first photodetector 91b than to use an output signal of fourth photodetector 92b in order to detect the reflected return light of second laser beam B on surface W1 of workpiece W by increasing the SN ratio.

For example, it is assumed that an output of first laser beam A is 6000 W and an output of second laser beam 13 is 1000 W. It is assumed that a transmittance of first laser beam A at dichroic mirror 40 is 99.9% (reflectance is 0.1%), and a reflectance of second laser beam B is 99.9% (transmittance is 0.1%).

In this case, as illustrated in FIG. 9, power of each of first laser beam A and second laser beam B decreases by 1% in a forward path toward workpiece W. The power of laser beam vignetted by the optical components including protective glass 14 is about 1% as for each of first laser beam A and the second laser beam.

Most of first laser beam A reflected by surface W1 of workpiece W passes through dichroic mirror 40, and a part of first laser beam A is reflected by the dichroic mirror. Assuming that there is no return light component A0, the former corresponds to return light component A1 and is detected by third photodetector 91a. The latter corresponds to return light component A3 (actually including return light component A4), and is detected by second photodetector 92a.

Most of first laser beam A vignetted on the surface of the optical components also passes through dichroic mirror 40. Therefore, vignetting component A2, which is the above component, is also detected by third photodetector 91a.

Thus, when first laser beam A reflected by surface W1 of workpiece W is to be detected by third photodetector 91a, vignetting component A2 is also detected, and thus the S/N ratio decreases. As is apparent from FIG. 9, a noise component caused by vignetting component A2 is as much as about 20% of a signal component caused by return light component A1 as a signal component.

On the other hand, first laser beam A vignetted on the surface of the optical components does not substantially enter second photodetector 92a. Therefore, the power of first laser beam A reflected by surface W1 of workpiece W can be accurately evaluated on the basis of the output signal of second photodetector 92a.

Similarly, most of first laser beam A reflected by surface W2 of workpiece W is reflected by dichroic mirror 40, and a part of first laser beam A passes through the dichroic mirror. Assuming that there is no return light component B0, the former corresponds to return light component B1 and is detected by first photodetector 91b. The latter corresponds to return light component B3 (actually including return light component B4), and is detected by fourth photodetector 92b.

However, most of second laser beam B vignetted on the surface of the optical components is also reflected by dichroic mirror 40. Therefore, vignetting component B2, which is the above component, is also detected by fourth photodetector 92b.

Thus, when second laser beam B reflected by surface W1 of workpiece W is to be detected by fourth photodetector 92b, vignetting component B2 is also detected, and thus the S/N ratio decreases. As is apparent from FIG. 9, a noise component caused by vignetting component B2 is as much as about 20% of a signal component caused by return light component B1 as a signal component.

On the other hand, second laser beam B vignetted on the surface of the optical components does not substantially enter first photodetector 91b. Therefore, the power of second laser beam 8 reflected by surface W1 of workpiece W can be accurately evaluated on the basis of the output signal of first photodetector 91b.

Effects and Others

As described above, laser processing head 10 according to the present exemplary embodiment includes housing 11 and the plurality of optical components disposed in housing 11.

Housing 11 is provided with first light entrance port 12a through which first laser beam A enters,
second light entrance port 12b through which second laser beam B enters, and light irradiation port 13 through which first laser beam A and second laser beam B are emitted to outside. Housing 11 is also provided with partition wall 11a that separates the optical path of first laser beam A entering through first light entrance port 12a from the optical path of second laser beam B entering through second light entrance port 12b. Second laser beam B has a shorter wavelength than first laser beam A.

Laser processing head 10 further includes first photodetector 91b provided around the optical path of first laser beam A entering through first light entrance port 12a, and a second photodetector 92a provided around the optical path of second laser beam B entering through second light entrance port 12b.

First photodetector 91b is disposed opposite to second photodetector 92a across partition wall 11a. First photodetector 91b receives light in the second wavelength band including the wavelength of second laser beam B. and second photodetector 92a receives light in the first wavelength band including the wavelength of first laser beam A.

At least some of the plurality of optical components are disposed in housing 11 such that the optical path of second laser beam B is changed and the optical axis of first laser beam A emitted from light irradiation port 13 substantially coincides with the optical axis of second laser beam B.

In the present exemplary embodiment, by providing second photodetector 92a receivable of first laser beam A around the optical path of second laser beam B, it is possible to correctly evaluate the power of first laser beam A reflected by surface W1 of workpiece W. It is therefore possible to accurately estimate a state of surface W1 of workpiece W and suppress occurrence of processing defects and deterioration in the processing quality when workpiece W is irradiated with first laser beam A.

Similarly, by providing first photodetector 91b receivable of second laser beam B around the optical path of first laser beam A, it is possible to correctly evaluate the power of second laser beam B reflected by surface W1 of workpiece W. It is therefore possible to accurately estimate the state of surface W1 of workpiece W and suppress occurrence of processing defects and deterioration in the processing quality when workpiece W is irradiated with second laser beam B.

First photodetector 91b is configured to be receivable of light in the second wavelength band wider than the wavelength region of second laser beam B. Second photodetector 92a is configured to be receivable of light in the first wavelength band wider than the wavelength region of first laser beam A. As a result, even when the wavelengths of first laser beam A and second laser beam B are shifted on surface W1 of workpiece W, the reflected return light can be reliably detected.

The first wavelength band preferably ranges from 900 nm to 1200 nm inclusive. The second wavelength band preferably ranges from 400 nm to 700 nm inclusive.

In a case where the near-infrared light is used as first laser beam A and the blue light is used as second laser beam B, by setting the ranges of the first wavelength band and the second wavelength band in this manner, the reflected return light can be reliably detected even when the wavelengths of the laser beams am shifted on surface W1 of workpiece W. When the infrared light is used as first laser beam A, the first wavelength band may range from 800 nm to 1200 nm inclusive. When the green light is used as second laser beam B, the second wavelength band may range from 500 nm to 750 nm inclusive.

Since the optical axis of first laser beam A and the optical axis of second laser beam B emitted from light irradiation port 13 substantially coincide with each other, the processing quality can be maintained even when laser processing is performed on workpiece W with first laser beam A and second laser beam 8 superimposed on each other.

The plurality of optical components include at least bend mirror 30 that is provided in the optical path of second laser beam B and reflects second laser beam B to change the optical path, dichroic mirror 40 that is provided in the optical path of first laser beam A and in the optical path of second laser beam B reflected by bend mirror 30, and protective glass 14 that covers light irradiation port 13.

Dichroic mirror 40 transmits most of first laser beam A to be directed to light irradiation port 13, and reflects the rest of first laser beam A to be directed to aperture 71. Aperture 71 transmits most of second laser beam B to be directed to light irradiation port 13, and reflects the rest of second laser beam B to be directed to aperture 71.

In this way, the optical axis of first laser beam A and the optical axis of second laser beam B substantially coincide with each other, and first laser beam A and second laser beam B can be emitted from light irradiation port 13. Thus, when workpiece W is subjected to laser processing with first laser beam A and second laser beam B superimposed on each other, the processing quality can be still maintained.

In housing 11, first collimator lens 20 is provided between first light entrance port 12a and dichroic mirror 40 in Z direction. Second collimator lens 21 is provided between second light entrance port 12b and bend mirror 30. Workpiece-side condensing lens 50 is provided between dichroic mirror 40 and light irradiation port 13.

First collimator lens 20 collimates first laser beam A and causes collimated first laser beam A to be incident on dichroic mirror 40. Second collimator lens 21 collimates second laser beam B and causes collimated second laser beam B to be incident on bend mirror 30. Workpiece-side condensing lens 50 condenses each of entering first laser beam A and second laser beam 11 at predetermined condensing positions.

In the present exemplary embodiment, the above configuration can make the optical axis of first laser beam A and the optical axis of second laser beam B directed from light irradiation port 13 to workpiece W substantially coincide with each other. First laser beam A and second laser beam B can be focused on surface W1 of workpiece W. As a result, the respective condensing positions of first laser beam A and second laser beam B on surface W1 of workpiece W can be made substantially coincide with each other.

The plurality of optical components include at least aperture 71 provided in the optical path of second laser beam B transmitted through dichroic mirror 40 and in the optical path of first laser beam A reflected by dichroic mirror 40, and detection-side condensing lens 70 provided in the optical paths of first laser beam A and second laser beam B transmitted through aperture 71.

Image sensor (fifth photodetector) 60 is disposed in housing 11 at a position to be receivable of first laser beam A and second laser beam B transmitted through detection-side condensing lens 70.

In this way, the spot of first laser beam A (detection-side first spot Saj) and the spot of second laser beam B (detection-side second spot Sbj) can be formed on light receiving surface 61 of image sensor 60. The condensing state of first laser beam A and second laser beam B on surface W1 of workpiece W can be estimated by evaluating images of detection-side first spot Saj and detection-side second spot Sbj, and detection-side first spot diameter Daj and detection-side second spot diameter Dbj which are the respective diameters of detection-side first spot Saj and detection-side second spot Sbj.

Aperture 71 can block excessive light fluxes of first laser beam A and second laser beam B directed to image sensor 60. It is therefore possible to reduce the power of first laser beam A and second laser beam B incident on light receiving surface 61 to suppress the occurrence of troubles such as image disturbance of detection-side first spot Saj and detection-side second spot Sbj and image burn-in of a color filter or the like provided in image sensor 60.

Image sensor 60 monitors the output of at least one of first laser beam A or second laser beam B. It is possible to estimate the output of first laser beam A and/or second laser beam B with which workpiece W is irradiated during the laser processing on the basis of the monitored output.

Image sensor (fifth photodetector) 60 includes at least a plurality of first light receivers (N pixels) that receive light in a wavelength band including the wavelength of first laser beam A and a plurality of second light receivers (B pixels) that receive light in a wavelength band including the wavelength of second laser beam B. The plurality of first light receivers and the plurality of second light receivers are arranged in a cyclical manner on light receiving surface 61 of image sensor 60.

Such a configuration of image sensor 60 makes it possible to acquire the spot images of first laser beam A and second laser beam B with high resolution. As a result, the respective condensing positions of first laser beam A and second laser beam B on surface W1 of workpiece W can be adjusted precisely.

Image sensor 60 preferably has a structure in which four pixels that respectively receive near-infrared light or infrared light, red light, green light, and blue light are arranged in a cyclical manner on light receiving surface 61.

This pixel structure, which is a known configuration and does not use a photodetector having a special structure, can suppress an increase in cost of laser processing head 10. Furthermore, since the output signal of image sensor 60 can be processed using a known signal processing device, an increase in a load of signal processing can be suppressed.

Laser processing system (laser processing apparatus) 1 according to the present exemplary embodiment includes at least laser processing head 10, first laser oscillator 2 that emits first laser beam A, and second laser oscillator 3 that emits second laser beam B.

Laser processing system 1 further includes first optical fiber 4 that is connected to first light entrance port 12a and transmits first laser beam A emitted from first laser oscillator 2 to laser processing head 10, and a second optical fiber 5 that is connected to second light entrance port 12b and transmits second laser beam B emitted from second laser oscillator 3 to laser processing head 10.

Laser processing head 10 irradiates workpiece W with at least one of first laser beam A or second laser beam B.

In the present exemplary embodiment, the respective condensing positions of first laser beam A and second laser beam B on surface W1 of workpiece W can be made substantially coincide with each other. Thus, when workpiece W is subjected to laser processing with first laser beam A and second laser beam B superimposed on each other, processing accuracy and processing quality can be improved.

Laser processing system 1 may further include manipulator 6 that movably holds laser processing head 10. In this way, laser processing can be easily performed on workpiece W having a complicated structure.

In laser processing system 1, the light condensing positions of first laser beam A and second laser beam B on surface W1 of workpiece W can be adjusted on the basis of an image of first laser beam A and second laser beam B acquired by image sensor 60. It is therefore easy to set the condemning positions of first laser beam A and second laser beam B on surface W1 of workpiece W to desired positions. This configuration can improve the processing accuracy and processing quality during the laser processing.

A method of determining abnormality according to the present exemplary embodiment is a method of determining abnormality for determining presence or absence of abnormality in laser processing system 1.

In a case where the workpiece is irradiated with second laser beam B, it is determined whether there is abnormality in the processing state of workpiece W on the basis of the output signal of first photodetector 91b. In a case where the workpiece is irradiated with first laser beam A, it is determined whether there is abnormality in the processing state of workpiece W on the basis of the output signal of second photodetector 92a.

In the present exemplary embodiment, a simple configuration of providing second photodetector 92a receivable of first laser beam A around the optical path of second laser beam B allows accurate estimation of the state of surface W1 when workpiece W is irradiated with first laser beam A. In addition, a simple configuration of providing first photodetector 91b receivable of second laser beam B around the optical path of first laser beam A allows accurate estimation of the state of surface W1 when workpiece W is irradiated with second laser beam B. It is therefore possible to suppress the occurrence of processing defects and deterioration in the processing quality during the laser processing.

Second Exemplary Embodiment

FIG. 10 illustrates an example of outputs of the second and third photodetectors when a workpiece is irradiated with the first laser beam according to the present exemplary embodiment.

As described above, by using image sensor 60, it is possible to accurately evaluate the power of first laser beam A and second laser beam B with which workpiece W is irradiated during the laser processing.

However, in performing this evaluation, it is necessary to install aperture 71 and detection-side condensing lens 70 in housing 11 after defining an arrangement relationship with image sensor 60. When laser processing head 10 needs to be further miniaturized, these components may be omitted in some cases.

The power of first laser beam A and second laser beam B may be further evaluated so as to complement a detection result of image sensor 60 in some cases.

In laser processing head 10 and laser processing system 1 according to the present disclosure, the state of surface W1 of workpiece W can be estimated and the power of first laser beam A and second laser beam B can be evaluated on the basis of the output signals of first to fourth photodetectors 91b. 92a, 91a. 92b simultaneously. Details are described below. For convenience of description, in the present exemplary embodiment, a case where workpiece W is irradiated with first laser beam A will be considered.

As described above, third photodetector 91a can detect return light component A1 among the reflected return light components of first laser beam A from workpiece W. Return light component A1 is considered to be substantially proportional to the power of first laser beam A with which workpiece W is irradiated.

Output signal P3 of third photodetector 91a includes vignetting component A2 in the optical component. A contribution of return light component A1 in output signal P3 can be evaluated by obtaining a ratio of return light component A1 and vignetting component A2 in advance by an experiment or the like.

Second photodetector 92a can detect component A3 which is a reflected return light component of first laser beam A from workpiece W.

Therefore, the power of the reflected return light of first laser beam A from workpiece W is estimated from output signal P2 of second photodetector 92a, output signal P3 of third photodetector 91a is further corrected on the basis of this value, and thus the power of first laser beam A with which workpiece W is irradiated can be estimated.

For example, as illustrated in cases 1, 2 in FIG. 10, a case is considered in which the reflected return light is not generated from workpiece W or is weak. In both cases, output signal P2 of second photodetector 92a is 0. On the other hand, output signal P3 of third photodetector 91a increases in proportion to the power of first laser beam A with which workpiece W is irradiated. When the power of first laser beam A is 500 W, output signal P3 is 5 W (case 1), and when the power of first laser beam A is 1000 W, output signal P3 is 10 W (case 2).

Here, a case where the reflected return light from workpiece W is generated (cases 3, 4 in FIG. 10) will be considered. Note that a ratio of output signal P2 and output signal P3 with respect to an output change of first laser beam A is obtained in advance by an experiment or the like. In this case, P2:P3 is 1:5. That is, a contribution of the reflected return light component from workpiece W in output signal P3 is five times as large as output signal P2.

In view of the above, when a numerical value illustrated in FIG. 10 is evaluated, in case 3 (where the power of first laser beam A is 1000 W), output signal P2 of second photodetector 92a is 1 W. On the other hand, output signal P3 of third photodetector 91a is 15 W. After an amount related to the reflected return light from workpiece W (=1 W×5=5 W) in output signal P3 is subtracted, an amount directly related to the power of first laser beam A with which workpiece W is irradiated is estimated to be 10 W. This value is the same value as output signal P3 in case 2 in which the power of first laser beam A is the same.

Similarly, in case 4 (where the power of first laser beam A is 500 W), output signal P2 of second photodetector 92a is 0.5 W. On the other hand, output signal P3 of third photodetector 91a is 7.5 W. After the amount related to the reflected return light from workpiece W (=0.5 W×5=2.5 W) in output signal P3 is subtracted, the amount directly related to the power of first laser beam A with which workpiece W is irradiated is estimated to be 5 W. This value is the same value as output signal P3 in case 1 in which the power of first laser beam A is the same.

As is apparent from the above, the power of first laser beam A with which workpiece W is irradiated can be estimated from output signal P3 by correcting output signal P3 of third photodetector 91a using output signal P2 of second photodetector 92a.

In a case where workpiece W is irradiated with second laser beam B, the power of the reflected return light of second laser beam B from workpiece W is estimated from output signal P1 of first photodetector 91b, output signal P4 of fourth photodetector 92b is further corrected on the basis of this value, and thus the power of second laser beam B with which workpiece W is irradiated can be clearly estimated.

In a case where workpiece W is irradiated with first laser beam A and second laser beam B simultaneously, the power of the reflected return light of first laser beam A from workpiece W is estimated from output signal P2 of second photodetector 92a, output signal P3 of third photodetector 91a is further corrected on the basis of this value, and thus the power of first laser beam A with which workpiece W is irradiated can be estimated. At the same time, the power of the reflected return light of second laser beam B from workpiece W is estimated from output signal P1 of first photodetector 91b, output signal P4 of fourth photodetector 92b is further corrected on the basis of this value, and thus the power of second laser beam B with which workpiece W is irradiated can be estimated.

Needless to say, a method of correcting output signal P3 and output signal P4 can be appropriately changed in accordance with a material of workpiece W, specifically, the reflectance of the workpiece W for the light in the wavelength band of first laser beam A and the light in the wavelength band of second laser beam B.

When laser processing system 1 is used for a long period of time, output signal P3 and output signal P4 may abnormally increase, and the above-described correction relationship may not hold. In such a case, it is suspected that vignetting light on the surface of the optical component such as protective glass 14 increases. That is, it is presumed that dirt adheres to the surface of the optical component, and vignetting components A2 and B2 increase.

That is, it can be said that the method of determining abnormality according to the present exemplary embodiment has the following configuration.

In a case where workpiece W is irradiated with second laser beam B, it is determined whether there is abnormality in the processing state of workpiece W on the basis of output signal P1 of first photodetector 91b.

In a case where workpiece W is irradiated with first laser beam A, it is determined whether there is abnormality in the processing state of workpiece W on the basis of output signal P2 of second photodetector 92a.

The output of first laser beam A is estimated on the basis of output signals P2, P3 of second photodetector 92a and third photodetector 91a.

The output of second laser beam B is estimated on the basis of output signals P1, P4 of first photodetector 91b and fourth photodetector 92b.

Third Exemplary Embodiment

Figure 11:
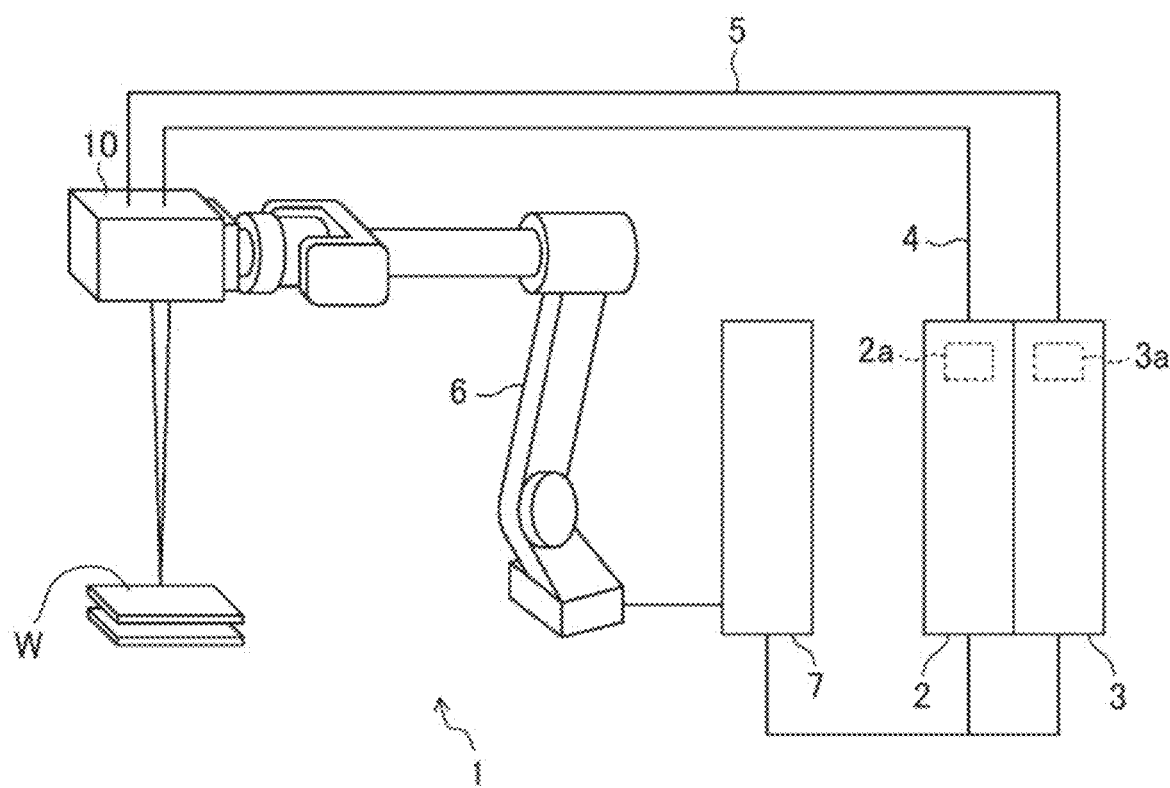
FIG. 11 is a schematic configuration diagram of a laser processing system according to a third exemplary embodiment.

FIG. 11 is a schematic configuration diagram of a laser processing system according to the present exemplary embodiment. FIG. 12 illustrates an example of outputs of the second, third, and sixth photodetectors when the workpiece is irradiated with the first laser beam. For convenience of description, in FIG. 11, the same parts as those in the first exemplary embodiment are denoted by the same reference marks, and the detailed description thereof will be omitted.

Laser processing system 1 according to the present exemplary embodiment illustrated in FIG. 11 is different from laser processing system 1 illustrated in FIG. 1 in that first laser oscillator 2 includes sixth photodetector 2a and second laser oscillator 3 includes seventh photodetector 3a.

Sixth photodetector 2a receives light in the first wavelength band, and has a structure similar to a structure of third photodetector 91a illustrated in FIG. 6A, for example. Sixth photodetector 2a is provided near a connection between first laser oscillator 2 and first optical fiber 4. Sixth photodetector 2a is disposed at a position to be receivable of the reflected return light of first laser beam A transmitted through first optical fiber 4.

Seventh photodetector 3a receives light in the second wavelength band, and has a structure similar to a structure of first photodetector 91b illustrated in FIG. 6A, for example. Seventh photodetector 3a is provided near a connection between second laser oscillator 3 and second optical fiber 5. Seventh photodetector 3a is disposed at a position to be receivable of the reflected return light of second laser beam B transmitted through second optical fiber 5.

In the present exemplary embodiment, it is possible to determine whether there is abnormality in the processing state of workpiece W when workpiece W is irradiated with first laser beam A or second laser beam B using first to fourth photodetectors 91b, 92a, 91a, 92b, sixth photodetector 2a, and seventh photodetector 3a. The power of first laser beam A and second laser beam B with which workpiece W is irradiated can be estimated, it is possible to determine whether there is abnormality in an optical component, for example, protective glass 14, in housing 11. A further description will be given with reference to FIG. 12. For convenience of description, FIG. 12 illustrate only an example in which workpiece W is irradiated with first laser beam A.

Cases 1, 2 in FIG. 12 are the same as cases 1, 2 in FIG. 10, respectively. Cases 5, 6 in FIG. 12 are the same as cases 3, 4 in FIG. 10, respectively. Therefore, detailed description thereof will be omitted. In cases 1, 2 in FIG. 12, output signal P6 of sixth photodetector 2a is 0 W. This is because the reflected return light from workpiece W is not generated or weak. In cases 5, 6 in FIG. 12, output signal P6 of sixth photodetector 2a is set to be the same as output signal P3 of third photodetector 91a.

Sixth photodetector 2a mainly receives component A0 among the return light components illustrated in FIG. 7 and outputs output signal P6. Similarly to return light component A1, return light component A0 is considered to be substantially proportional to the power of first laser beam A with which workpiece W is irradiated.

Cases 3, 4 in FIG. 12 are cases where vignetting light is generated on the surface of protective glass 14 in addition to the reflected return light from workpiece W.

In this case, vignetting component A2 is included in output signal P3 of third photodetector 91a as described above. Vignetting component A2 is generated when spatter or fume adheres to the surface of protective glass 14 or the like, and first laser beam A is reflected by irregularities generated on the surface. Since the irregularities include a large number of sizes equivalent to the wavelength of first laser beam A, a scattering angle of first laser beam A increases. As a result, vignetting component A2 hardly enters first optical fiber 4 and is hardly detected by sixth photodetector 2a. In view of the above, when output signal P3 of third photodetector 91a is larger than output signal P6 of sixth photodetector 2a, it can be determined that output signal P3 includes vignetting component A2.

The value of output signal P3 in case 3 is the same as the value (=15 W) in case 5, while output signal P6 is 0 W. In this case, a contribution of the reflected return light from protective glass 14 is estimated to be about 1 W from the ratio or difference between return light component A1 and vignetting component A2 obtained in advance.

Also in case 3, output signal P6 is 0 W. The contribution of the reflected return light from protective glass 14 is estimated to be about 1 W from the ratio or difference between return light component A1 and vignetting component A2 obtained in advance.

As is apparent from the above, it is possible to compare output signal P3 of third photodetector 91a with output signal P6 of sixth photodetector 2a to estimate the power of first laser beam A that is vignetted by the surface of the optical component such as protective glass 14.

In a case where workpiece W is irradiated with second laser beam B, it is obviously possible to compare output signal P4 of fourth photodetector 92b with output signal P7 of seventh photodetector 3a to estimate the power of second laser beam B that is vignetted by the surface of the optical component such as protective glass 14.

In a case where workpiece W is irradiated with first laser beam A and second laser beam B simultaneously, it is possible to compare output signal P3 of third photodetector 91a with output signal P6 of sixth photodetector 2a to estimate the power of first laser beam A that is vignetted by the surface of the optical component such as protective glass 14. At the same time, it is possible to compare output signal P7 of seventh photodetector 3a with output signal P4 of fourth photodetector 92b to estimate the power of second laser beam B that is vignetted by the surface of the optical component such as protective glass 14.

The present exemplary embodiment enables achieving effects similar to those achieved by the structure shown in the first and second exemplary embodiments. That is, it can be said that the method of determining abnormality according to the present exemplary embodiment has the following configuration.

In a case where workpiece W is irradiated with second laser beam B, it is determined whether there is abnormality in the processing state of workpiece W on the basis of output signal Pt of first photodetector 911b.

In a case where workpiece W is irradiated with first laser beam A, it is determined whether them is abnormality in the processing state of workpiece W on the basis of output signal P2 of second photodetector 92a.

The output of first laser beam A is estimated on the basis of output signals P2. P3 of second photodetector 92a and third photodetector 91a.

The output of second laser beam B is estimated on the basis of output signals P1, P4 of first photodetector 91b and fourth photodetector 92b.

It is determined whether there is abnormality in the optical components disposed in the optical path of first laser beam A on the basis of output signals P3, P6 of third photodetector 91a and sixth photodetector 2a.

It is determined whether there is abnormality in the optical components disposed in the optical path of second laser beam B on the basis of output signals P4, P7 of fourth photodetector 92h and seventh photodetector 3a.

The present disclosure is useful because of being applicable to a laser processing head and a laser processing system that emit laser beams having different wavelengths.

What is claimed is:

1. A laser processing head comprising:
 a housing; and
 S a plurality of optical components disposed in the housing, wherein
 the housing includes
 a first light entrance port through which a first laser beam enters,
 a second light entrance port through which the second laser beam enters,
 a light irradiation port through which the first laser beam and the second laser beam are emitted to an outside, and
 a partition wall that separates an optical path of the first laser beam entering through the first light entrance port from an optical path of the second laser beam entering through the second light entrance port,
 the second laser beam has a wavelength shorter than a wavelength of the first laser beam,
 the laser processing head includes
 a first photodetector provided around the optical path of the first laser beam entering through the first light entrance port, and
 a second photodetector provided around the optical path of the second laser beam entering through the second light entrance port,
 the first photodetector is disposed opposite to the second photodetector across the partition wall,
 the first photodetector receives light in a second wavelength band including the wavelength of the second laser beam,
 the second photodetector receives light in a first wavelength band including the wavelength of the first laser beam, and
 at least some of the plurality of optical components are disposed in the housing to make an optical axis of the first laser beam emitted from the light irradiation port and an optical axis of the second laser beam substantially coincide with each other by changing the optical path of at least one of the first laser beam or the second laser beam.

2. The laser processing head according to claim 1, wherein
 the plurality of optical components include at least
 a bend mirror that is provided in the optical path of the second laser beam and reflects the second laser beam to change the optical path,
 a dichroic mirror provided in the optical path of the first laser beam and in the optical path of the second laser beam reflected by the bend mirror, and
 a protective glass that covers the light irradiation port, and
 the dichroic mirror transmits most of the first laser beam to be directed to the light irradiation port and reflects most of the second laser beam to be directed to the light irradiation port.

3. The laser processing head according to claim 2, wherein
 the housing is provided inside with
 a first collimator lens disposed between the first light entrance port and the dichroic mirror, a second collimator lens disposed between the second light entrance port and the bend mirror, and a workpiece-side condensing lens disposed between the dichroic mirror and the light irradiation port, the first collimator lens collimates the first laser beam and causes the first laser beam to be incident on the dichroic mirror, the second collimator lens collimates the second laser beam and causes the second laser beam to be incident on the bend mirror, and the workpiece-side condensing lens condenses the first laser beam and the second laser beam that have been incident at respective predetermined condensing positions.

4. The laser processing head according to claim 2, wherein the plurality of optical components further include an aperture provided in the optical path of the second laser beam transmitted through the dichroic mirror and in the optical path of the first laser beam reflected by the dichroic mirror, and a detection-side condensing lens provided in the optical paths of the first laser beam and the second laser beam that have passed through the aperture, the housing is provided inside with a fifth photodetector disposed at a position to be receivable of the first laser beam and the second laser beam that have been transmitted through the detection-side condensing lens, and the fifth photodetector monitors an output of at least one of the first laser beam or the second laser beam.

5. The laser processing head according to claim 4, wherein the fifth photodetector includes at least a plurality of first light receivers that receive light in a wavelength band including a wavelength of the first laser beam, and a plurality of second light receivers that receive light of a wavelength band including a wavelength of the second laser beam, and the plurality of first light receivers and the plurality of second light receivers are arranged in a cyclical manner on a light receiving surface of the fifth photodetector.

6. The laser processing head according to claim 5, wherein the fifth photodetector is an image sensor in which four pixels that respectively receive near-infrared light or infrared light, red light, green light, and blue light are arranged in a cyclical manner on the light receiving surface.

7. The laser processing head according to claim 1, wherein the first wavelength band ranges from 900 nm to 1200 nm inclusive, and the second wavelength band ranges from 400 nm to 700 nm inclusive.

8. The laser processing head according to claim 1, further comprising:

a third photodetector provided around the optical path of the first laser beam entering through the first light entrance port; and a fourth photodetector provided around the optical path of the second laser beam entering through the second light entrance port, wherein the third photodetector is disposed opposite to the fourth photodetector across the partition wall, the third photodetector receives the light in the first wavelength band, and the fourth photodetector receives the light in the second wavelength band.

9. A laser processing system comprising:

the laser processing head according to claim 1;

a first laser oscillator that emits the first laser beam;

a second laser oscillator that emits the second laser beam;

a first optical fiber that is connected to the first light entrance port and transmits the first laser beam emitted from the first laser oscillator to the laser processing head; and a second optical fiber that is connected to the second light entrance port and transmits the second laser beam emitted from the second laser oscillator to the laser processing head, wherein the laser processing head irradiates a work-piece with at least one of the first laser beam or the second laser beam.

10. A laser processing system comprising:

the laser processing head according to claim 8;

a first laser oscillator that emits the first laser beam;

a second laser oscillator that emits the second laser beam;

a first optical fiber that is connected to the first light entrance port and transmits the first laser beam emitted from the first laser oscillator to the laser processing head; and a second optical fiber that is connected to the second light entrance port and transmits the second laser beam emitted from the second laser oscillator to the laser processing head, wherein the laser processing head irradiates a workpiece with at least one of the first laser beam or the second laser beam.

11. The laser processing system according to claim 10, wherein the first laser oscillator is provided with a sixth photodetector disposed at a position near a connection with the first optical fiber to be receivable of reflected return light from the first optical fiber, and the second laser oscillator is provided with a seventh photodetector disposed at a position near a connection with the second optical fiber to be receivable of reflected return light from the second optical fiber.

* * * * *